March 31, 1959
C. W. VAN RANST
2,879,872
SPEED RANGE DRIVE UNIT
Filed April 12, 1956
2 Sheets-Sheet 1
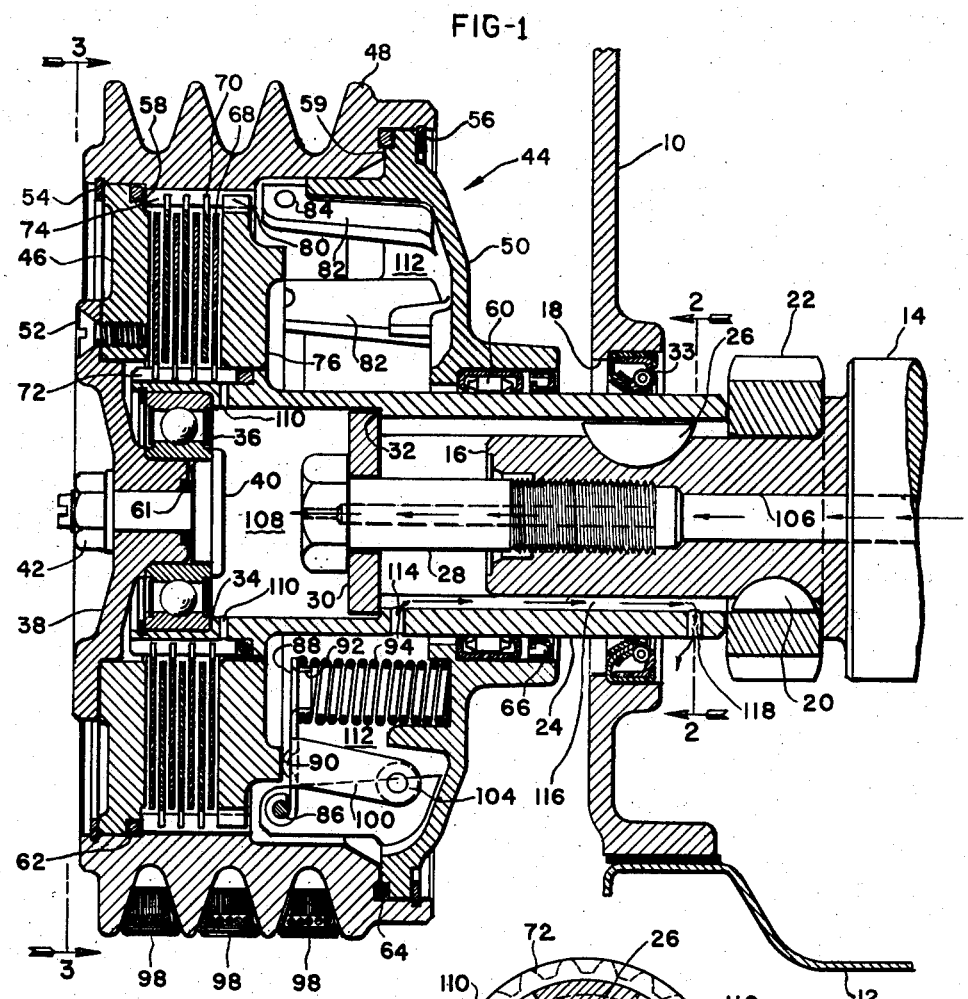
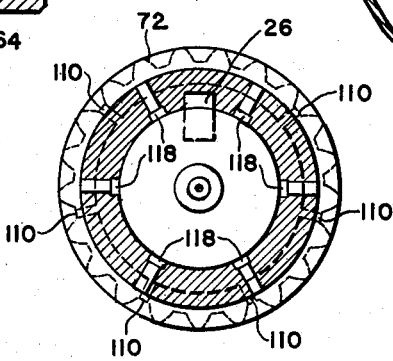
INVENTOR.
CORNELIUS W. VAN RANST
BY
SMITH, OLSEN, LEWIS & McRAE.
ATTORNEYS.

March 31, 1959 C. W. VAN RANST 2,879,872
SPEED RANGE DRIVE UNIT
Filed April 12, 1956 2 Sheets-Sheet 2
FIG-3
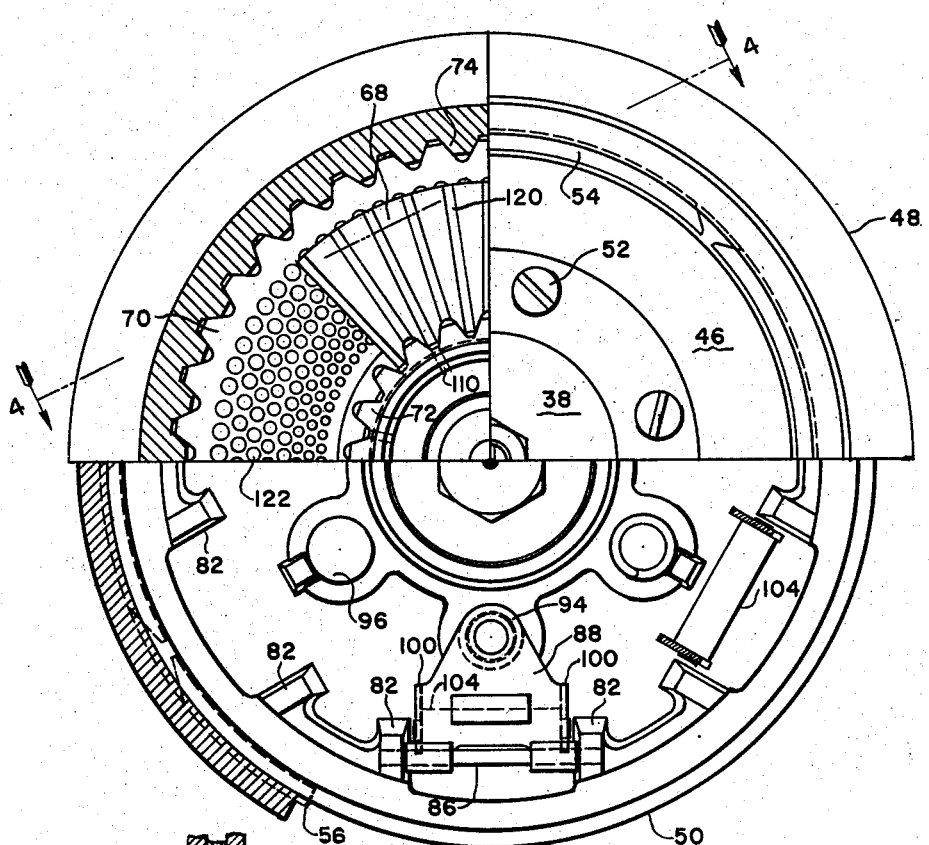
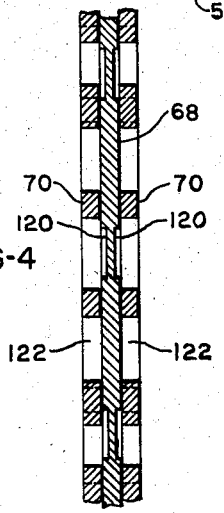
FIG-4
INVENTOR.
CORNELIUS W. VAN RANST
BY
SMITH, OLSEN, LEWIS & McRAE.
ATTORNEYS.

United States Patent Office 2,879,872
Patented Mar. 31, 1959

2,879,872

SPEED RANGE DRIVE UNIT

Cornelius W. Van Ranst, Dearborn, Mich.

Application April 12, 1956, Serial No. 577,849

5 Claims. (Cl. 192—104)

The present invention relates to a clutch driving mechanism for engine accessories of an internal combustion engine. This application is a continuation-in-part of my copending application, Serial No. 471,303, filed November 26, 1954.

It is conventional practice to drive the various automobile accessories, such as the fan, generator and the like, directly or indirectly from the crank shaft of the engine. In recent years this has presented a problem of providing adequate means for operating the several accessories at a constant speed when the engine speed goes beyond a predetermined r.p.m. One solution was taught in my prior Patent No. 2,079,724, granted May 11, 1937.

The increased use of additional accessories, such as air conditioner equipment, for example, has further accentuated this problem. Failure to provide adequate speed control means not only may be harmful to the driven accessories, but also may result in higher performance specifications being imposed on the manufacturers of such accessories, which in turn will increase the cost of the latter to the automobile manufacturer and ultimately to the purchaser of the automobile. Thus, it has become increasingly important that a more satisfactory speed control drive mechanism be developed, particularly with the advent of the high speed automobiles of today.

It is an object of the present invention to provide an improved accessory drive mechanism which is constructed and arranged to provide a single driving means from the engine to the engine accessories which imparts rotation in accordance with the engine speed below a predetermined engine r.p.m. and which imparts a constant speed of rotation when the engine speed is above the predetermined r.p.m.

It is another object of the present invention to provide an improved accessory drive mechanism of the foregoing character which is operatively positioned externally of the engine and which has a unique system of conduits for receiving oil from the engine lubricating oil system and, after utilizing such oil, for returning the same to said lubricating oil system.

It is still another object of the present invention to provide an improved accessory drive mechanism of the foregoing character which has a plurality of driving and driven disks constructed and arranged to receive a flow of oil therebetween, the surface configurations of said disks being such as to permit the disks when urged together to remain locked against relative rotation by the forces of cohesion in the oil, and which is such as to cause the film of oil to be readily ruptured when the force urging the plates together is released and torque is applied to the driving plates tending to rotate them relative to the driven plates.

Still another object of the present invention is to provide an accessory drive mechanism of the foregoing character wherein the disks are annular in shape and are enclosed in a drum-shaped member mounted on a drive shaft, the location of the oil feed and return conduits being such as to allow the plates to be completely immersed in oil by centrifugal action whenever the engine is in operation, thereby assuring uniform operating characteristics of the drive mechanism.

It is still another object of the present invention to provide an accessory drive mechanism which is characterized by its simplicity of operation, relatively low cost and sturdy construction.

Other objects of this invention will appear in the following description and appended claims, reference being had to the accompanying drawings forming a part of this specification wherein like reference characters designate corresponding parts in the several views.

In the drawings:

Figure 1 is a fragmentary sectional view illustrating one embodiment of the invention mounted on the forward end of an engine crank shaft;

Figure 2 is a section taken on the line 2—2 of Figure 1;

Figure 3 is an end elevation looking in the direction of the arrows 3—3 of Figure 1, with portions removed to show various internal elements of the illustrated embodiment; and Figure 4 is a fragmentary section taken on the line 4—4 of Figure 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the illustrated embodiment will be given. The forward portion of the engine can be seen in Figure 1 to which attention is directed. The motor block 10 is of the conventional type having an oil pan 12 mounted on the under side of the block in the usual manner. Crank shaft 14 has an elongated end portion 16 of reduced diameter projecting through the opening 18 in the forward end of motor block 10. Keyed at 20 to the reduced end portion 16 is a gear 22 for driving a gear train to the cam shaft (not shown).

A hub member 24 is mounted on the reduced end portion 16 and is retained against relative rotation by the key 26. The hub member 24 is held against axial movement by means of a bolt 28 threadedly connected to the end portion 16 and a washer 30 held between the head of bolt 28 and the shoulder 32 formed on the inner wall of hub member 24. A conventional oil seal 33 is positioned in opening 18 between motor block 10 and hub member 24.

The outer end of hub member 24 has a second shoulder 34 formed therein against which is seated the outer race of a ball bearing 36, the inner race serving to support and center the cap 38. The latter is fastened to the inner race by means of the bolt 40 and nut 42.

The cap 38 is a part of the drum-shaped member 44 which is rotatably mounted on the hub member 24 and includes the annular front plate 46, the cylindrical member 48 and the annular rear member 50. The plate 46 is secured to the cap by a plurality of screws 52, and the cylindrical member 48 is retained on the plate 46 and rear member 50 by means of retainer rings 54 and 56 which cooperate with the internal shoulders 58 and 59 for clamping said plate 46 and rear member 50 therebetween. Disposed between the inner circumference of annular rear member 50 and the hub member 24 is a frictionless type needle bearing 60.

Thus, it can be seen that the drum-shaped member 44 is in effect an integral unit which is supported at its forward end on the ball bearing 36 and on its rear end on the needle bearing 60, both of said bearings being carried by said hub member 24, thereby allowing substantially frictionless rotation between the drum-shaped member 44 and the hub member 24 which are telescopingly fitted together. In order to prevent leakage of oil from the drum-shaped member 44, gasket rings are provided at 61, 62 and 64. Furthermore, an oil seal ring 66 is provided between the relatively rotatable members 24 and 44. From the foregoing it can be seen that a hollow drum-shaped member 44 is mounted on the hub member 24 in a fluid tight relation and also so that relative rotation is permissible between such members. Since hub member 24 is keyed to crank shaft 14, the drum-shaped member 44 is mounted for relative rotation with respect to crank shaft 14.

Between the outer circumference of hub member 24 and the inner circumference of cylindrical member 48 are positioned a series of annular clutch disks 68 and 70. Disks 68 are slidably positioned on the external splines 72 formed on the outer circumference of hub member 24, and disks 70 are similarly positioned on the internal splines 74 formed on the inner surface of the cylindrical member 48. The outer and inner edges respectively of the disks 68 and 70 terminate short of the opposite splines 74 and 72, thereby resulting in disks 68 being drivingly connected to hub member 24 and disks 70 being drivingly connected to cylindrical member 48. The disks 68 and 70 can be moved axially together, as will be described, to provide a driving connection from the crank shaft 14 to the drum-shaped member 44.

For the purpose of urging disks 68 and 70 together, an annular pressure plate 76 is provided which is slidable and non-rotatably connected to the cylindrical member 48 by virtue of the external splines 80 fitted into the internal splines 74. A mechanism is provided within the drum-shaped member 48 on the opposite side of pressure plate 76 from the disks 68 and 70 for controlling axial movement of said pressure plate 76.

This mechanism includes six units, circumferentially equidistantly spaced within the drum-shaped member 48, and only one of such units will be described. Each of such units includes a pair of spaced axially extending, radially inwardly projecting lugs 82 with holes bored therethrough, as at 84 for receiving a pivot pin 86. Carried for pivotal movement on pin 86 is a spring plate 88 having a protrusion 90 for engaging the pressure plate 76. Radially inwardly on spring plate, a collar 92 has been formed for retaining a coil spring 94 which is mounted in compression between said spring plate 88 and a cup-like portion 96 in the rear member 50. Thus, by virtue of the locations of the fulcrum or pivot pin 86, the coil spring 94 and protrusion 90, the normal position of pressure plate 76 will be one in which it is urging the disks 68 and 70 into frictional engagement, thereby providing a driving connection between crank shaft 14 and drum-shaped member 48. By this arrangement the various engine accessories (not shown) which are driven by the belts 98 will always have a direct drive when the engine is started.

However, as previously stated, it is highly desirable that after a predetermined engine r.p.m. is reached, a constant speed is imparted to the accessories when the engine is operated above that predetermined engine r. p. m. To aid in accomplishing this purpose, a pair of arms 100 project from the spring plate 88, and at their outer ends carry a centrifugal weight 104. The length of arms 100, the mass of the centrifugal weight 104, and the spring 94 are calibrated so that the centrifugal force acting on centrifugal weight 104 will overcome the pressure of spring 94 at the aforesaid predetermined r.p.m., thereby releasing pressure on the disks 68 and 70 and allowing relative slippage therebetween.

Thus, operation of the mechanism is such that when the automobile engine is operated below a predetermined r.p.m. disks 68 and 70 will be urged into close non-slip relation by the action of springs 94. The effect is that the drum-shaped member 44 and hub member 24 will rotate together as a unit to provide a positive drive between the automobile engine and the various engine accessories. Whenever the speed of the engine is increased beyond the predetermined r.p.m., weights 104 are subjected to centrifugal forces so as to be moved outwardly, overcoming the forces of springs 94 and allowing pressure plate 76 to slide to the right as seen in Figure 1. The effect is that disks 68 and 70 then slip on one another so as to limit the seed of the drum-shaped member 48 and belts 98.

Those skilled in the art will readily recognize that slippage of disks 68 and 70 relative to one another will result in overheating and scoring of such disks unless adequate lubricating and cooling means are provided. In order to assure adequate lubrication, the present invention makes use of the forced feed lubricating system of the automobile engine. Since the operating components of the clutch driving mechanism are located exterior of the engine, a unique lubricating system is provided wherein the lubricating oil is taken under pressure from the engine and after being utilized is returned to the sump of the engine.

Referring to Figure 1, the path of flow of the oil will be described. Assuming the automobile engine is turning over, lubricating oil will flow under pressure through duct 106 in the direction of the arrows and will discharge, still under pressure, into chamber 108. From chamber 108 the oil will be discharged outwardly through the plurality of radial ducts 110 and will flow axially between splines 72 and radially outwardly between disks 68 and 70. After passing between disks 68 and 70, the oil will begin its return passage between splines 74 into the annular chamber 112 and from there inwardly through radially disposed ducts 114 in the hub member 24. It can be seen that the drum-shaped member 44 will always be filled with lubricating oil when the engine is turning over, because centrifugal forces will tend to throw the oil radially outward, and it can flow through ducts 114 only because of the pressures from the engine forced feed lubricating system. The oil then flows back to the engine sump via axial ducts 116 in the direction of the arrows and radial ducts 118. Since the forced feed lubricating system of the engine will always be pumping oil into duct 106, the drum-shaped member 44 will always be filled with oil thereby assuring uniform operating characteristics of the clutch drive mechanism.

In order to obtain the optimum results from the clutch drive mechanism, certain novel features are incorporated in the disks 68 and 70. Disks 68 are the driving clutch elements and preferably are formed from steel having strength and wear resisting properties, while the driven disks 70 preferably will be made from aluminum, bronze or other non-ferrous metals having good heat conducting properties. This property aids in dissipating the heat generated when slippage occurs between the disks 68 and 70.

Another feature of the present invention is the surface configurations of the disks 68 and 70. Referring to Figures 3 and 4, it can be seen that disks 68 have radially extending grooves 120 which are similarly located on both sides of disks 68; whereas, disks 70 have circumferential rows of holes 122 therethrough, the number of holes 122 in each row being equal. These surface configurations accomplish several results. The grooves 120 assure that adequate oil is present to lubricate the adjacent surfaces of the disks when relative movement initially occurs after the predetermined r.p.m. has been reached. By virtue of the presence of the oil filled grooves, there always will be an abundance of oil present to wipe over the surface of any bare metal that may exist. Furthermore, the grooves permit excess oil to flow assuring cooling of the entire clutch drive mechanism.

In addition, other important and less obvious results are obtained. The particular arrangement of the holes 122 and the numbers and arrangement thereof, which preferably eliminates about 75 percent of the effective friction surface of the disks 70, assures relatively uniform operating characteristics of the clutch drive mechanism. Thus, it will be uniform in its operation of converting to constant r.p.m. driving at the predetermined engine r.p.m.

In considering this matter, it should be understood that friction disks having smooth surfaces and immersed in oil will not separate axially when the pressure plate 76 is released unless external forces are applied. This condition exists because of the cohesive forces which hold the disks and oil together. However, the particular arrangements of holes 122 and grooves 120 are found to overcome this problem effectively, because the films of oil are promptly broken when relative rotation between disks 68 and 70 occurs if torque is applied to the driving disk 68 relative to the driven disk 70. The disks 68 and 70 then release because the oil film is promptly broken and pressure plate is not urging the disks together, and a strong axial force is not necessary to accomplish this result as is necessary with smooth surfaced disks. Moreover, since the governor weights 104 are located on the driven side of the clutch drive mechanism, the disks 68 and 70 will not remain apart but will be urged back together again by springs 94 on slowing down of the released driven disks 70. A form of hunting action will then occur whereby slippage will take place between disks 68 and 70, and the latter disks 70 will not turn in excess of the predetermined r.p.m.

From the foregoing, it can be seen that a small compact clutch drive mechanism is provided which releases when the predetermined engine r.p.m. is exceeded and then will slip as is required to maintain a safe maximum r.p.m. Furthermore, it can be operated by utilizing lubricating oil from the forced feed lubricating system of the engine with no oil losses occurring. The drive mechanism is constructed and arranged so as to avoid overheating and to operate in a most efficient manner.

Having thus described my invention, I claim:

1. In an engine having a pressure lubricating system, an accessory drive mechanism comprising a hollow drum-shaped member closed at its forward end and having an aperture in its rear end, a shaft member telescopingly fitting in said aperture in liquid tight relation and rotatable with respect to said drum-shaped member, clutch disks in the latter arranged in parallel relation, every other disk being fixed to rotate with said shaft member and having radially outwardly directed grooves in each of its sides, the remaining disks being fixed to rotate with the drum-shaped member, conduit means in said shaft member for directing the oil from said pressure lubricating system to the radially inner edges of said disks for flow therebetween and through said grooves, other conduit means in said shaft member in fluid communication with the radially outer edges of said disks for returning oil to said pressure lubricating system, and means responsive to engine speed for regulating the spacing of said disks above a predetermined speed of the engine.

2. In an engine having a pressure lubricating system, an accessory drive mechanism comprising a hollow drum-shaped member closed at its forward end and having an aperture in its rear end, a shaft member telescopingly fitting in said aperture in liquid tight relation and rotatable with respect to said drum-shaped member, clutch disks in the latter arranged in parallel relation, every other disk being fixed to rotate with said shaft member and having radially outwardly directed grooves in each of its sides, the remaining disks being fixed to rotate with the drum-shaped member and having a plurality of apertures therethrough, conduit means in said shaft member for directing oil from said pressure lubricating system to the radially inner edges of said disks, other conduit means in said shaft member in fluid communication with the radially outer edges of said disks for returning oil to said pressure lubricating system, and means responsive to engine speed for regulating the spacing of said disks above a predetermined speed of the engine.

3. An accessory drive mechanism as claimed in claim 2 wherein the apertures in said second named disks eliminate approximately seventy-five percent of the effective friction surfaces of such disks.

4. In an engine having a pressure lubricating system, an accessory drive mechanism comprising a hollow drum-shaped member closed at its forward end and having an aperture in its rear end, a shaft member telescopingly fitting in said aperture in liquid tight relation and rotatable with respect to said drum-shaped member, clutch disks in the latter arranged in parallel relation, every other disk being fixed to rotate with said shaft member and being formed from steel, the remaining disks being fixed to rotate with the drum-shaped member and being formed from a non-ferrous, high heat conductive material, conduit means in said shaft member for directing oil from said pressure lubricating system to the radially inner edges of said disks, other conduit means in said shaft member in fluid communication with the radially outer edges of said disks for returning oil to said pressure lubricating system, and means responsive to engine speed for regulating the spacing of said disks above a predetermined speed of the engine.

5. An accessory drive mechanism as claimed in claim 4 wherein said second-named disk is formed from aluminum.

References Cited in the file of this patent

UNITED STATES PATENTS

| | | |
|---|---|---|
| 1,039,305 | Martin | Sept. 24, 1912 |
| 1,189,176 | Price | June 27, 1916 |
| 1,380,823 | Matthews et al. | June 7, 1921 |
| 1,928,301 | Pierson | Sept. 26, 1933 |
| 2,054,377 | Havill et al. | Sept. 15, 1936 |
| 2,079,724 | Van Ranst | May 11, 1937 |
| 2,432,591 | Schuchers | Dec. 16, 1947 |
| 2,684,743 | Trofimov | July 27, 1954 |

FOREIGN PATENTS

| | | |
|---|---|---|
| 579,061 | Germany | June 21, 1933 |